United States Patent
Cohen et al.

(10) Patent No.: US 11,416,529 B2
(45) Date of Patent: *Aug. 16, 2022

(54) MINIMUM COORDINATION PASSAGE SCORING

(71) Applicant: International Business Machines Corporation, Armonk, NY (US)

(72) Inventors: Doron Cohen, Mobile Misgav (IL); Haggai Roitman, Yoknea'm Elit (IL); Oren Sar-Shalom, Nes Ziona (IL)

(73) Assignee: International Business Machines Corporation, Armonk, NY (US)

( * ) Notice: Subject to any disclaimer, the term of this patent is extended or adjusted under 35 U.S.C. 154(b) by 366 days.

This patent is subject to a terminal disclaimer.

(21) Appl. No.: 16/699,771

(22) Filed: Dec. 2, 2019

(65) Prior Publication Data
US 2021/0165812 A1  Jun. 3, 2021

(51) Int. Cl.
*G06F 7/00* (2006.01)
*G06F 16/33* (2019.01)
*G06N 20/00* (2019.01)
*G06V 30/148* (2022.01)
*G06V 30/413* (2022.01)

(52) U.S. Cl.
CPC ...... *G06F 16/3334* (2019.01); *G06F 16/3344* (2019.01); *G06N 20/00* (2019.01); *G06V 30/153* (2022.01); *G06V 30/413* (2022.01)

(58) Field of Classification Search
CPC ............. G06F 16/3334; G06F 16/2457; G06F 16/313; G06F 16/24578; G06N 20/00; G06V 30/413; G06V 30/153
See application file for complete search history.

(56) References Cited

U.S. PATENT DOCUMENTS

| | | | |
|---|---|---|---|
| 8,275,803 B2* | 9/2012 | Brown | G06F 16/3329 |
| | | | 705/14.44 |
| 9,424,299 B2 | 8/2016 | Bufe et al. | |
| 9,940,367 B1* | 4/2018 | Baker | G06F 16/24578 |
| (Continued) | | | |

OTHER PUBLICATIONS

Aqeel Hussain, "Textual Similarity," published by the Technical University of Denmark, pp. 1-86, 2012, available at http://www2.imm.dtu.dk/pubdb/edoc/imm6364.pdf (Year: 2012).*

(Continued)

*Primary Examiner* — Mohammad A Sana
(74) *Attorney, Agent, or Firm* — Ziv Glazberg (57) ABSTRACT

A computer-implemented method, computerized apparatus and computer program product for minimum coordination passage scoring. Given a candidate passage in a document collection potentially matching a query received, a set of overlapping terms between the candidate passage and the query is determined. For each overlapping term in the set, a first measure of a weight of the term in the query, a second measure of a weight of the term in the candidate passage, and a third measure of a specificity of the term in the document collection are calculated. a function of the first and second measure is evaluated to obtain a value reflecting a condition on the relation therebetween. A minimum coordination score representing a relative similarity between the candidate passage and the query is determined based on the value and the first, second and third measures obtained for each of the overlapping terms.

7 Claims, 4 Drawing Sheets

(56) References Cited

U.S. PATENT DOCUMENTS

| | | | |
|---|---|---|---|
| 10,180,964 B1 * | 1/2019 | Baker | G06F 16/245 |
| 10,558,692 B2 * | 2/2020 | Cohen | G06F 16/334 |
| 2016/0224663 A1 | 8/2016 | Nolan et al. | |
| 2016/0232157 A1 | 8/2016 | Mansour et al. | |
| 2016/0246875 A1 | 8/2016 | Brown et al. | |

OTHER PUBLICATIONS

Petra Galuščáková., "Segmentation strategies for passage retrieval in audio-visual documents", SIGIR '13 Proceedings of the 36th international ACM SIGIR conference on Research and development in information retrieval pp. 1143-1143, 2013.

David Carmel et al., "Position-Based Contextualization for Passage Retrieval", CIKM '13 Proceedings of the 22nd ACM international conference on Information & Knowledge Management, pp. 1241-1244, 2013.

Gordon V. Cormack et al., "Passage-Based Query Renement (MuitiText Experiments for TREC-6)", Information Processing & Management, vol. 36, Issue 1, Jan. 2000, pp. 133-153.

Man-Hung Jong et al., "A Method of Passage-Based Document Retrieval in Question Answering System", Cornell University Library, Submitted on Dec. 17, 2015, p. 2.

* cited by examiner

MINIMUM COORDINATION PASSAGE SCORING

CROSS-REFERENCE TO RELATED APPLICATIONS

This application is a continuation and claims the benefit of U.S. non-provisional application Ser. No. 15/275,494 filed Sep. 26, 2016, which is hereby incorporated by reference in its entirety.

TECHNICAL FIELD

The present disclosure relates to information retrieval technology in general, and to scoring candidate passages of a given corpus for passage retrieval applications, in particular.

BACKGROUND

In the field of information retrieval (IR) technology, passage retrieval is the task of extracting, matching and/or ranking candidate passages (e.g., sentences, paragraphs, pages, or the like) in a document collection or corpus based on their relevance to a given query. A basic passage retrieval flow may comprise the following exemplary procedures: document retrieval, wherein a given query and top-k matching documents are obtained; passage extraction, where candidate passages are extracted from each document; passage statistics/meta-data, where statistics and/or meta-data of the input query and optionally matching passages are gathered; passage scoring, where candidate passages are scored; and, passage response, where top-m matching passages are outputted.

Passage retrieval may be a basic and necessary step in many IR and cognitive technology applications, such as, for example: document scoring, wherein passage relevance may be propagated to documents, i.e. a document score may be derived from a score of passages comprised in it; question answering, wherein candidate answers may be extracted from passages or documents and scored based on a given query and/or evidences provided; evidence retrieval, wherein passages may be re-ranked based on a query and a given answer and/or entity which the query is focused at (e.g., a query may be "what is the capital of France and where is it located?", in which case the relevant entity is the city of Paris); opinion retrieval, wherein passages may be re-ranked based on their opinionated score (i.e., passages are scored not only by their relevance to the query but also by a level of opinion being expressed therein about a query topic); document or multi-document summarization, wherein top ranking passages may be selected for summarization, possibly based on novelty and/or coherency considerations; other Natural Language Generation (NLG) applications; or the like.

BRIEF SUMMARY

One exemplary embodiment of the disclosed subject matter is a computer-implemented method comprising: obtaining a set of candidate passages in a document collection, each of which candidate passages are potential matches for a query; for each candidate passage in the set, assigning a score by performing the steps of: determining a set of overlapping terms between the candidate passage and the query; calculating, for each overlapping term in the set, a first measure of a weight of the term in the query, a second measure of a weight of the term in the candidate passage, and a third measure of a specificity of the term in the document collection; evaluating a function of the first and second measure to obtain a value reflecting a condition on the relation therebetween; and determining, based on the value and the first, second and third measures obtained for each of the overlapping terms, a minimum coordination score representing a relative similarity between the candidate passage and the query.

Another exemplary embodiment of the disclosed subject matter is a computerized apparatus having a processor, the processor being adapted to perform the steps of: obtaining a set of candidate passages in a document collection, each of which candidate passages are potential matches for a query; for each candidate passage in the set, assigning a score by performing the steps of: determining a set of overlapping terms between the candidate passage and the query; calculating, for each overlapping term in the set, a first measure of a weight of the term in the query, a second measure of a weight of the term in the candidate passage, and a third measure of a specificity of the term in the document collection; evaluating a function of the first and second measure to obtain a value reflecting a condition on the relation therebetween; and determining, based on the value and the first, second and third measures obtained for each of the overlapping terms, a minimum coordination score representing a relative similarity between the candidate passage and the query.

Yet another exemplary embodiment of the disclosed subject matter is a computer program product comprising a non-transitory computer readable storage medium retaining program instructions, which program instructions when read by a processor, cause the processor to perform a method comprising: obtaining a set of candidate passages in a document collection, each of which candidate passages are potential matches for a query; for each candidate passage in the set, assigning a score by performing the steps of: determining a set of overlapping terms between the candidate passage and the query; calculating, for each overlapping term in the set, a first measure of a weight of the term in the query, a second measure of a weight of the term in the candidate passage, and a third measure of a specificity of the term in the document collection; evaluating a function of the first and second measure to obtain a value reflecting a condition on the relation therebetween; and determining, based on the value and the first, second and third measures obtained for each of the overlapping terms, a minimum coordination score representing a relative similarity between the candidate passage and the query.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to determine scoring of candidate passages in a corpus or collection of documents, wherein the score of a passage may express its relevance or match level to a given query, whereby candidate passages may be ranked for further processing in any one of various passage retrieval applications.

Numerous approaches to the task of ranking passages or documents in a query results set have been proposed. On many occasions, these approaches may use any number or type of ranking functions that may be based on various statistical measures, such as, for example: a measure known as "term frequency" ("tf" in short), which measures the weight of a term in a passage with respect to the number of its occurrences therein; a measure known as "inverse document frequency" ("idf" in short), which measures the amount of information a term provides, or its specificity, i.e. whether it is common or rare across all documents in the collection; or the like. The product of the term frequency and inverse document frequency measures, known as "tf-idf", represents the estimated importance of a term to a document in a collection. Thus, the sum of the tf-idf of each of the query terms covered by that document may serve as a relatively simple example of a ranking function. It should be appreciated that different variants of weighting schemes for the tf and idf statistics may be applied, such as, for example, Boolean frequencies, logarithmically scaled values (e.g., frequency and inverse fraction of containing documents, respectively), augmented frequency (e.g., dividing the raw term frequency by the maximum raw frequency of any term in the document to prevent a bias towards longer documents), smoothed or probabilistic inverse document frequency, and so forth.

One basic approach to passage scoring, known as "self-scoring" or "self-passage scoring", considers only the query and the passage's own features. For example, the sum of tf-idf of all query terms covered by the passage, as defined in equation (1) below, is classified as a self-scoring method:

$$Score_{psg}(p;q) \overset{def}{=} \Sigma_{t \in q \cap p} tf(t,p)*idf(t) \qquad (1)$$

Another basic approach considers additional features relating to a document and/or collection at hand. For example, a smoothing scheme may be employed using scores of other passages in the same document and/or a relative score of that document with respect to the all documents in the collection, such as illustrated in equation (2) below:

$$Score_{psgDoc}(p;q) \overset{def}{=} \qquad (2)$$
$$(1-\lambda)\frac{Score_{psg}(p;q)}{\sum_{p' \in d_p} Score_{psg}(p';q)} + \lambda \frac{Score_{doc}(d_p;q)}{\sum_{d' \in D_n} Score_{doc}(d';q)}$$

Yet another basic approach considers additional or alternative features relating to a context of a passage, such as neighboring passages and relevance thereof, or the like. For example, a local context smoothing scheme, similar to as employed in a global context of an entire document or collection as described above, may be used such as a left/right smoothing as illustrated in equation (3) below:

$$Score_{psgNeighbor}(p;q) \overset{def}{=} (1-\lambda_l-\lambda_r)Score_{psgDoc}(p;q) + \lambda_l Score_{psgDoc}(p_l;q) + \lambda_r Score_{psgDoc}(p_r;q) \qquad (3)$$

Over the years, other more complex approaches have been suggested. One such approach is passage density scoring, such as the method described in Lee et al., "SiteQ: Engineering High Performance QA system Using Lexico-Semantic Pattern Matching and Shallow NLP" TREC 2001, hereby incorporated by reference in its entirety without giving rise to disavowment. Under the SiteQ approach, the score of several sentences in passage (typically up to three) is summed, where the score is comprised of two scoring terms: the first scoring term scores a passage based on importance of its matching query terms (e.g., using tf-idf or the like); the second scoring term scores a passage based on its matching query terms and their dispersion i.e., the more important terms appear closer to each other, the higher the score is, and vice versa.

Another relatively more elaborate approach to passage scoring is the Positional Language Model Scoring, as presented in Carmel et al., "Position-based contextualization for passage retrieval". CIKM 2013, pp. 1241-1244, ACM, NY, USA, hereby incorporated by reference in its entirety without giving rise to disavowment. This approach uses a function that models a probability of a term in an origin position o will "propagate" to a random position x. The score is defined using either a Gaussian or Trapezoidal probability density function kernel as in equation (4), where the kernel is defined either as in equation (5) or equation (6) below, respectively:

$$Score_{PLM}(p;q) \overset{def}{=} \sum_{t \in q \cap d} idf(t) * \left[ \sum_{o \in Occ(t,d)} \int_{p \cdot s}^{p \cdot e} f_L(o,x)dx \right] \qquad (4)$$

$$f_L^G(o,x) \overset{def}{=} e^{-\frac{(o-x)^2}{2\sigma^2}} \qquad (5)$$

$$f_L^T(o,x) \overset{def}{=} \begin{cases} 1 & p^o \cdot s \leq x \leq p^o \cdot e \\ \max\left(0, 1 - \frac{1}{\sigma}*(p^o \cdot s - x)\right) & x < p^o \cdot s \\ \max\left(0, 1 - \frac{1}{\sigma}*(p^o \cdot e - x)\right) & x > p^o \cdot e \end{cases} \qquad (6)$$

where Occ(t,d) is the set of occurrences of a term t in a document d, $p^o$ is a passage containing the term in position o, and s and e denote "start" and "end" of passage, respectively.

Yet another type of scoring techniques includes the so-called fixed-point or "Random Walk" approaches, such as, for example, the LexRank or biased LexRank method, as described in Otterbacher et al. "Biased LexRank: Passage Retrieval using Random Walks with Question-Based Priors" (2008), hereby incorporated by reference in its entirety without giving rise to disavowment. Under this approach, a measure of relevance is propagated from one passage to another based on similarity thereto. The scores can be thus calculated using spectral methods or the like, e.g. using eigenvectors or eigenvalues of the adjacency matrix of the induced graph, which vertices thereof correspond to passages, and edges to similarity relation among vertices pairs.

Yet another class of passage scoring techniques, which is based on the notion of support set, is one known as passage centrality approach, such as described in Ribeiro et al., "Self Reinforcement for Important Passage Retrieval", SIGIR 2013, hereby incorporated by reference in its entirety without giving rise to disavowment. According to this approach, after dealing with aspects of selecting representatives for equivalence classes, a first step of the method is to compute a set consisting of the most semantically related passages, to be designated as the support set. Then, the most important passages, i.e. top-ranking, are the ones that occur in the largest number of support sets.

A further detailed review and discussion of passage scoring approaches can be found, for example, in the following: Salton et al., "Approaches to Passage Retrieval in Full Text Information Systems", SIGIR '93, pp. 49-58, ACM, NY, USA; Tellex et al., "Quantitative Evaluation of Passage Retrieval Algorithms for Question Answering", SIGIR 2003, pp. 41-47, ACM, NY, USA; and, Liu et al., "Passage Retrieval Based on Language Models", CIKM 2002, pp. 375-382, ACM, NY, USA; all hereby incorporated by reference in entirety without giving rise to disavowment.

It will be appreciated that a passage score is meant to indicate whether the passage matches the input query or not, and to what extent, if possible. One requirement on the passage for being considered a "good" match is that it contains as many important "hotspots" or occurrences thereof as possible, where a hotspot is a term appearing in an input query, and where a term's importance is reflected in features extracted, e.g. tf-idf or likewise numerical statistics.

Another such requirement for qualifying as "good" match is that the passage contains as many hotspots types as possible, i.e. multiple distinct terms different from one another, as may be reflected for example in a scoring scheme known as Jaccard, computed as illustrated in equation (7) below:

$$\text{score}(p; q) = \frac{|q \cap p|}{|q \cup p|} \quad (7)$$

Thus, as can be readily appreciated, the measure of hotspot types ignores all repetitions of the term within the passage.

On some occasions, the passage may be required to satisfy both requirements simultaneously, i.e. contain as many types of hotspots and occurrences thereof as possible, as expressed for example in the Generalized Jaccard scoring, illustrated in equation (8) below:

$$\text{score}(p; q) = \frac{\sum_{t \in q \cap p} \min(tf(t, q), tf(t, p))}{\sum_{t \in q \cap p} \max(tf(t, q), tf(t, p))} \quad (8)$$

However, while such self-passage scoring approaches as above may use different passage features, the relationship between the query and passage yet still may get "broken".

Another technical problem dealt with by the disclosed subject matter is to mitigate overemphasis of a hotspot within a passage, e.g. a high tf weight due to multiple repeated occurrences in a passage of a same query term, which may cause a mismatching passage to rank higher than it properly should.

Yet another technical problem dealt with by the disclosed subject matter is to mitigate overemphasis of non-hotspots within a passage, i.e. non-important or irrelevant query terms appearing in a passage, which may overwhelm ability of a good passage to rank higher, such as may be the case in the Generalized Jaccard scoring, for example.

One technical solution is to apply a scoring scheme that reflects a level of compatibility or correlation between a query and a passage to be scored. A query is considered an "ideal" passage, such that each candidate passage should strive to be "ideal". In the context of the present disclosure, this so-called correspondence or harmony between a query and a passage is referred to as "minimum coordination". In some exemplary embodiments, the minimum coordination property may be measured by the relative number of query terms that are covered within the passage. In some exemplary embodiments, a passage may be allowed to cover a single query term ("hotspot") no more times than its number of occurrences in the query (hence, a "minimum" coordination criterion).

Another technical solution is to introduce one or more relaxation parameters into the "minimum coordination" score, whereby a certain degree of flexibility is allowed with respect to the said "ideality" constraint. In the context of the present disclosure, this relaxed version of the afore-said "minimum coordination" passage scoring technique, is referred to as "loose minimum coordination", or "LMC", in short. Similarly, each of the relaxation parameter(s) is referred to as a "loose" parameter. In some exemplary embodiments, a relaxation parameter may be introduced to each query term individually. Alternatively, a single, global relaxation parameter may be utilized. In some exemplary embodiments, the introduction of the relaxation parameter(s) into the passage score may be translated into a transformation or modification to the original input query, which so-called "loose" or relaxed version thereof thus obtained is referred to in the context of the present disclosure as "pseudo query".

In some exemplary embodiments, the LMC passage scoring may be implemented as defined in equation (9) as follows:

$$\text{Score}_{psg}(p; q) \overset{\text{def}}{=} \frac{\sum_{t \in q \cap p} \min(\beta * tf(t, f), tf(t, p)) * idf(t)}{\sum_{t \in q} tf(t, q) * idf(t)} \quad (9)$$

where β is a "loose" parameter which allows controlling the extent to which a given passage must exactly follow the "ideal" passage (i.e. the input query), wherein the larger the "loose" parameter is, the more it allows deviation from an "ideal" passage, and vice versa. It will be appreciated that, via a relaxation operation using β as a relaxation parameter in a LMC passage scoring, such as illustrated in equation (9) above, a corresponding pseudo query may thus be obtained.

In some further exemplary embodiments, the parameterization may be applied per each unique query term individually, such as illustrated in equation (10) as follows:

$$Score_{psg}(p; q) \stackrel{def}{=} \frac{\sum_{t \in q \cap p} \min(\beta_t * tf(t, q), tf(t, p)) * idf(t)}{\sum_{t \in q} \beta_t * tf(t, q) * idf(t)} \quad (10)$$

where $\beta_t$ is a "loose" parameter by which a pseudo query may be obtained via a relaxation operation, similarly as may be performed with the relaxation parameter $\beta$ applied to all respective query terms globally, as described above. It will be appreciated that the quantity $\beta_t*tf(t, q)$ may be a measure of term frequency of a pseudo query term. It will be further appreciated that, intuitively, passages that include more important query terms are allowed to deviate more from an "ideal" passage.

It will be appreciated that, in the context of the present disclosure, while the measure of idf, i.e. inverse document frequency, which aims to capture a global relative importance of a query term, is employed in exemplary passage scoring implementations such as portrayed in equations (9)-(10) above, the disclosed subject matter is not limited in that manner, and any other global term importance measure, such as, for example, term centrality measures, probabilistic relevance framework (PRF), or the like, may be utilized in a "minimum coordination" or "loose minimum coordination" passage scoring scheme, wither with global or individual "loose" parameter(s).

It will be appreciated that the "minimum coordination" or "loose minimum coordination" passage scoring approach in accordance with the disclosed subject matter may provide a self-passage scoring approach, thus not requiring utilization of score(s) of other passage(s), i.e. using "context" information, in contrast with other techniques, such as review above. It will further be appreciated that the disclosed subject matter may require neither semantic analysis or processing of a document, decomposition of a query into sub-queries for scoring and aggregation thereof, analyzing documents to extract relevant or associated topics, people, or likewise meta-data, computing distances between covered query terms, nor the like.

One technical effect of utilizing the disclosed subject matter is to allow drawing a comparison between a given passage and an "ideal" passage that may provide exact cover to the query. It will be appreciated that the similar a given passage to such an "ideal" passage is, the better. Hence, an "ideal" passage may provide an upper bound for passage scoring (and hence, the usage of minimum to achieve such upper bound, as in some exemplary embodiments illustrated herein), from which no passage can further gain in contributing more occurrences of query terms ("hot-spots") that are already fully covered.

Another technical effect of utilizing the disclosed subject matter is to allow relaxation of an "ideal" passage definition via use of a parametrized version of passage score, whereby providing passage with an opportunity to gain more weight under loose bound conditions.

Yet another technical effect of utilizing the disclosed subject matter is to provide a relatively simple yet powerful direct passage scoring approach that is light-weight in computation resources on the one hand while outperforming other scoring techniques such as the above mentioned.

It will be appreciated that in the context of the present disclosure, "term" is understood to mean an atomic unit of a query, such as defined by the specific target application. In particular, a term in a passage may be any n-gram, sequences of n-grams, or the like. In some exemplary embodiments, the original terms of the input query may be expanded, such as by morphological variants, synonyms, organizing topics or related entities in a knowledge base, and so forth. It will further be appreciated that the disclosed subject matter may be utilized following a pre-processing stage, whereby the respective query terms have been determined.

Figure 1A:
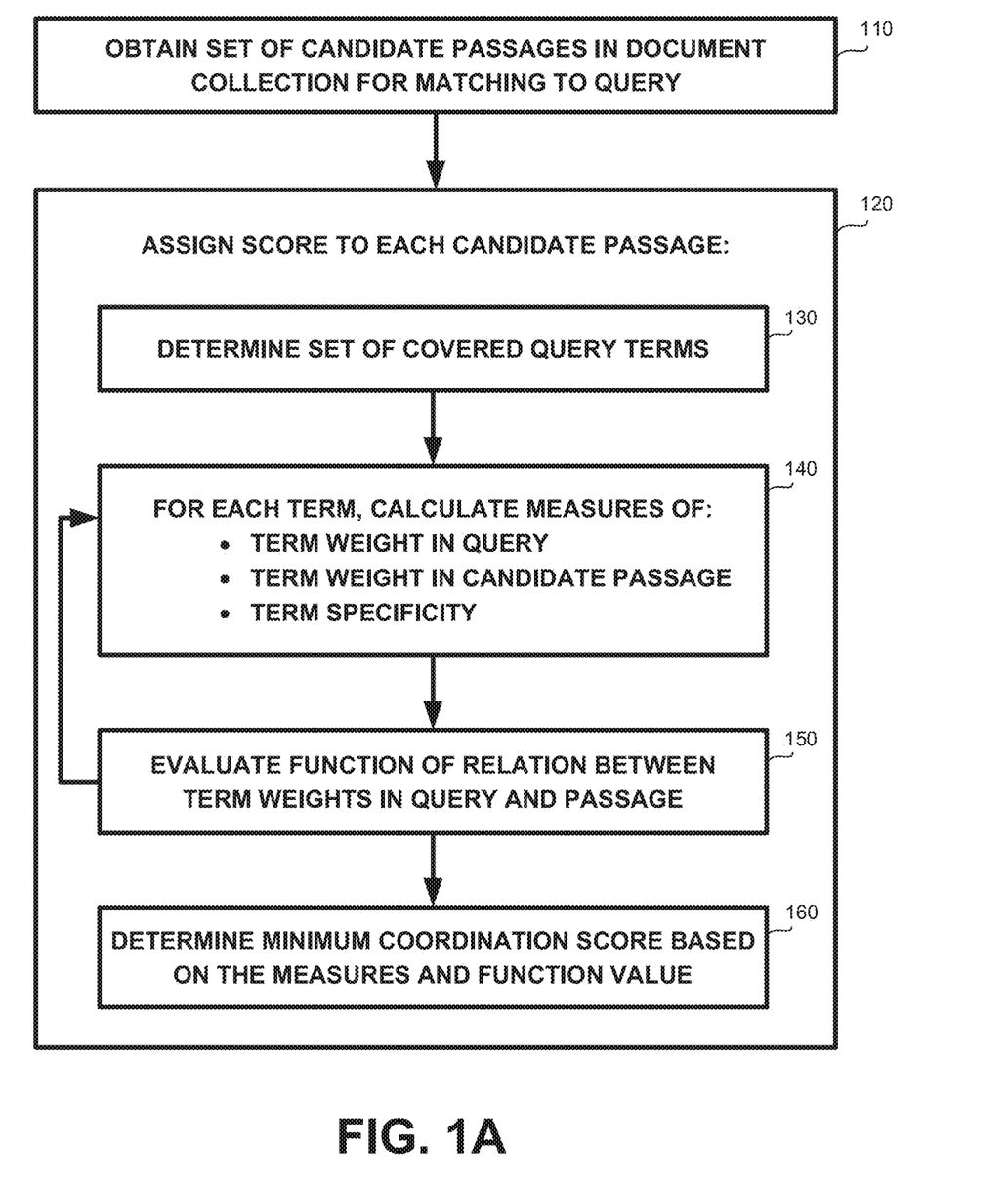
FIG. 1A shows a flowchart diagram of a method for minimum coordination passage scoring, in accordance with some exemplary embodiments of the disclosed subject matter.

Referring now to FIG. 1A showing a flowchart diagram of a method for minimum coordination passage scoring, in accordance with some exemplary embodiments of the subject matter.

On Step 110, a set of candidate passages in a given document collection or corpus, wherein each passage may be a possible match for a given query received as input, may be obtained. The set of candidate passages may be obtained using any common available technique of passage retrieval, in the veins of the generalized passage retrieval procedure flow as discussed above.

On Step 120, a score may be assigned to each candidate passage of the set obtained on Step 110. In some exemplary embodiments, the score may be assigned by means of performing one or more of the following Step(s) 130 to 160, as described hereinafter. Step 120 may be repeated for each of the candidate passages in the set obtained on Step 110 until all of them are ranked. The candidate passages and/or assigned scores may be outputted or provided as input to another process for further usage. In some exemplary embodiments, the candidate passages may be sorted in accordance with their assigned score and only the top-ranked candidates and/or candidates with ranking over a predetermined threshold may be passed on to a subsequent stage.

On Step 130, a set of overlapping terms between the candidate passage and the query may be determined. The set of overlapping terms may be determined using set algebra operation, such as an intersection operation on the set of terms contained in the query with the set of terms contained in the candidate passage, a difference operation on the set of query terms wherein query terms not covered by, i.e. appear within the candidate passage, are taken out from an initial set containing the terms appearing in the query, or the like.

On Step 140, for each term in the set of overlapping terms, as determined on Step 130, a first measure of a weight of the term in the query, a second measure of a weight of the term in the candidate passage, and a third measure of a specificity of the term in the document collection, may be calculated. In some exemplary embodiments, the first measure may be a term frequency of the term in the query, or the like. Similarly, the second measure may be a term frequency of the term in the candidate passage. In some exemplary embodiments, the third measure may be an inverse document frequency of the term in the collection. It will be appreciated that any other suitable measures may be employed in lieu of term frequency and/or inverse document frequency, as also any acceptable version of weighting scheme, as discussed in detail above.

On Step 150, a function of the first and second measure as calculated on Step 140 may be evaluated to obtain a value reflecting a condition on the relation therebetween. In some exemplary embodiments, the condition may mandate that the second measure does not exceed the first measure, thereby providing an upper bound on its magnitude. For example, the function may be a minimum function, whereby the value obtained is the smallest argument of the function, or the like. As another example, the function may be implemented as an if-else clause, wherein the evaluated term may contain a comparison operator such as ≤ or the like.

In some exemplary embodiments, Steps 140 to 150 may be repeated for each term of the set of covered query terms as obtained on Step 130, until all such overlapping terms of the query and candidate passage have been processed.

On Step 160, a minimum coordination score, representing a relative similarity between the candidate passage and the query, may be determined. The minimum coordination score may be determined based on the first, second and third measures obtained on Step 150, and the value obtained on Step 160, for each of the overlapping terms, respectively. In some exemplary embodiments, the determination of the minimum coordination score may comprise performing a summation over all terms in the set of overlapping terms. In some further exemplary embodiments, arguments of the sum may be determined based on the value and the third measure of each of the overlapping terms. The summation may optionally be normalized, such that the minimum coordination score ranges between 0 and 1. In some further exemplary embodiments, the normalization factor may be a sum of the product of term frequency and inverse document frequency weights of each of the covered query terms, such as calculated in Step 140.

Figure 1B:
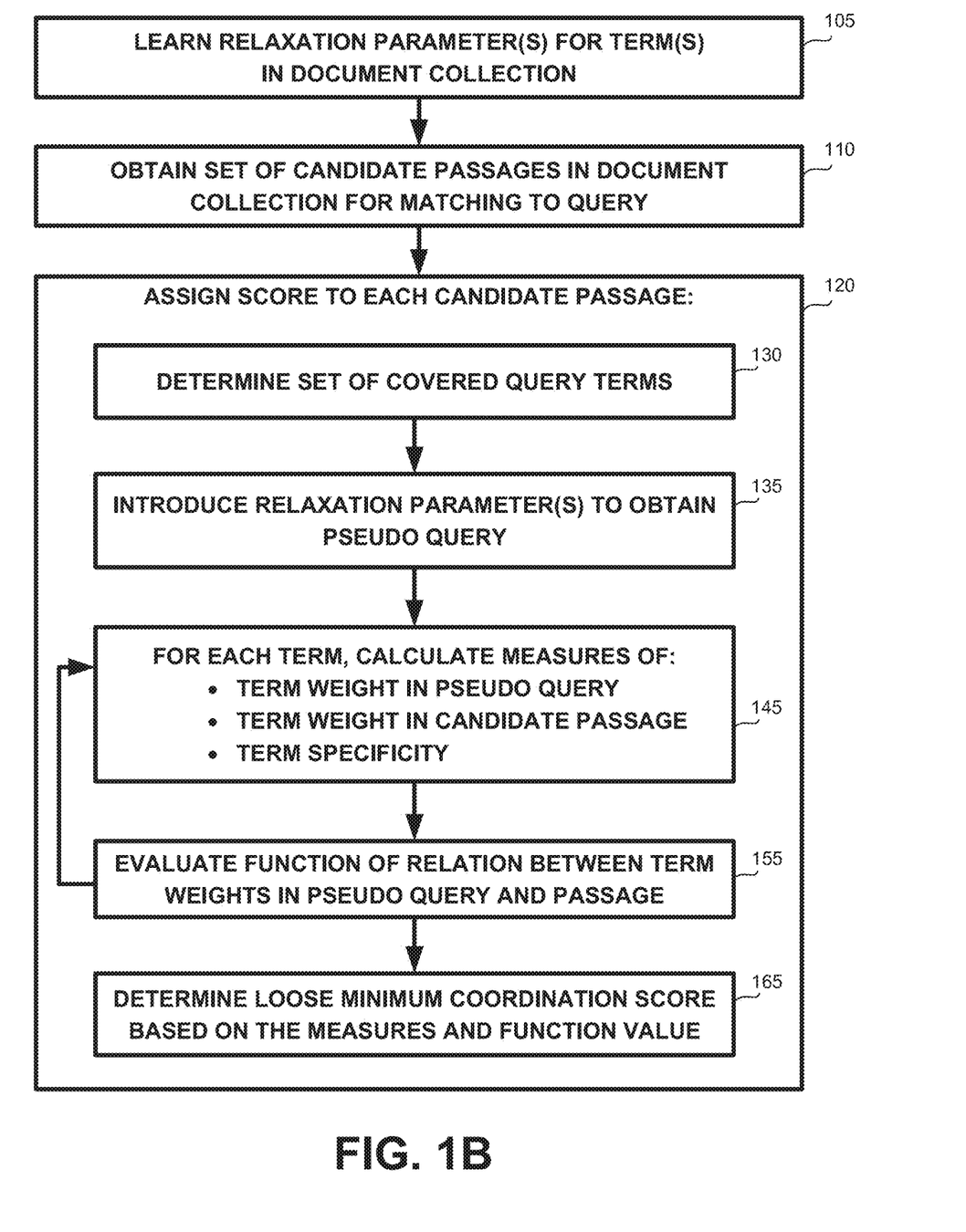
FIG. 1B shows a flowchart diagram of a method for loose minimum coordination passage scoring, in accordance with some exemplary embodiments of the disclosed subject matter.

Referring now to FIG. 1B showing a flowchart diagram of a method for loose minimum coordination passage scoring, in accordance with some exemplary embodiments of the subject matter.

On Step 105, one or more relaxation parameters for transforming a query into a pseudo query in a loose minimum coordination passage scoring computation may be learned. The relaxation parameter(s) may be either a single global parameter or individual parameters each of which corresponding to a particular term in a dictionary. The dictionary of terms may be built either offline in a pre-processing stage using passages and/or documents of a given collection or corpus, or created dynamically on-the-fly during runtime of a passage retrieval application process. In particular, it will be appreciated that Step 105 may be performed either prior to Step 110 as shown in FIG. 1B or subsequent thereto, as well. The learning of relaxation parameter(s) may be performed using any commonly available machine learning techniques for parameters estimation, such as, for example, Support Vector Machine (SVM), Expectation Maximization (EM), or the like. In some exemplary embodiments, a supervised machine learning process may be employed for this purpose.

On Step 110, a set of candidate passages potentially matching an input query may be obtained, similarly as in FIG. 1A.

On Step 125, a candidate passage in the set obtained on Step 110 may be assigned a score to reflect the extent to which it matches or not the given input query, similarly as in FIG. 1A. Step 125 may be repeated for each of the candidate passages until all of them have been processed and assigned with a score.

On Step 130, a set of query terms covered by the candidate passage, i.e. overlapping terms between the query and the passage, may be determined, similarly as in FIG. 1A.

On Step 135, the one or more relaxation parameters learned on Step 105 may be introduced to covered query terms, as determined on Step 130, to obtain pseudo query representing a relaxed version of the original input query received.

On Step 145, for each covered query term in the set determined on Step 130, a first measure of a weight of the term in the pseudo query, a second measure of a weight of the term in the candidate passage, and a third measure of a specificity of the term in the document collection, may be calculated, similarly as the calculation in Step 140 of FIG. 1A with respect to the original input query.

On Step 155, a function of a relation between term weights in the pseudo query and the candidate passage, as calculated on Step 145, may be evaluated, similarly as in Step 150 of FIG. 1A with respect to the original input query, to obtain a value representing a condition enforced on a relationship among said term weights. The condition may relate to a loose minimum coordination requirement between a term frequency in the original input query and the candidate passage, whereby a relaxation of a minimum coordination constraint on these two measures, by which the query term frequency places an upper bound on the term frequency within the candidate passage, may be obtained, such as discussed and illustrated herein.

It will be appreciated that Steps 145 to 155 may be performed repeatedly for each of the overlapping terms of the query and the candidate passage, as determined on Step 130, until the entire set is exhausted and the respective first, second and third measures and function value are obtained.

On Step 165, a loose minimum coordination score, representing a relative similarity between the candidate passage and the pseudo query, may be determined, similarly as in Step 160 of FIG. 1A, with respect to a minimum coordination score and similarity reflected thereby between the original input query and candidate passage, as discussed above. It will be appreciated that the pseudo query and loose minimum coordination score based thereon, as obtained by applying the relaxation parameter(s) as learned in Step 105 to the covered query terms determined in Step 130, may thus provide a more flexible constraint on the candidate passage as to the degree of its similarity to the query, i.e., its closeness to being an "ideal" passage, like the query is considered to be. In some exemplary embodiments, a normalization factor used in the score determination, such as discussed herein, may be based on the learned relaxation parameter(s), as obtained on Step 105.

Figure 2:
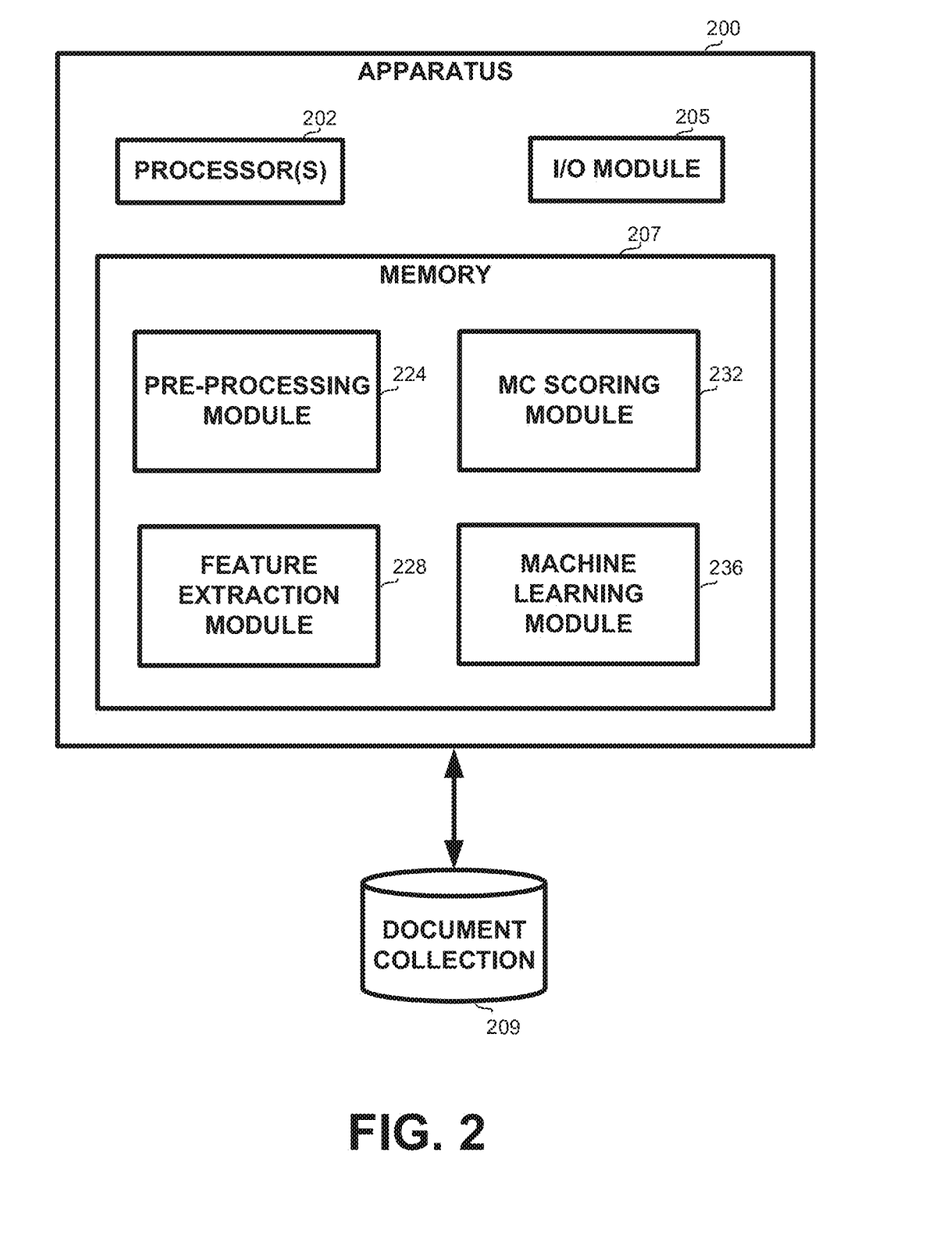
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An Apparatus 200 may be configured to support parallel user interaction with a real world physical system and a digital representation thereof, in accordance with the disclosed subject matter.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) module 205. I/O Module 205 may be utilized to provide an output to and receive input from a user, such as, for example receive a query, output retrieved passages and/or scoring thereof, browse and/or store documents in a collection or corpus, solicit user feedback on predicted relevancy of passages as reflected in their scoring, or the like.

In some exemplary embodiments, Apparatus 200 may comprise Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200.

In some exemplary embodiments, Apparatus 200 may comprise or be in communication with a Document Collection 209, from which documents, passages and/or likewise precursors for the disclosed subject matter to be applied thereon may be retrieved. Document Collection 209 may be a collection of documents, a corpus (i.e. a structured set of documents pre-processed and electronically retrievable from storage), or the like.

Pre-Processing Module 224 may be configured to obtain a set of candidate passages in Document Collection 209, each of which potentially matching a received input query, similarly as in Step 110 of FIGS. 1A and 1B.

Feature Extraction Module 228 may be configured to determine a set of overlapping terms between a query and a candidate passage in a set as obtained by Pre-Processing Module 224, similarly as in Step 130 of FIG. 1A. Feature Extraction Module 220 may be further configured to calculate, for each term in the set of covered query terms within the candidate passage, a first measure of a weight of the term in the query, a second measure of a weight of the term in the candidate passage, and a third measure of a specificity of the term in Document Collection 209, similarly as in Step 140 of FIG. 1A. In some exemplary embodiments, Feature Extraction Module 228 may be configured to evaluate a function of the first and second measures calculated, whereby obtaining a value reflecting a relationship therebetween and/or enforcing a condition on such relation, similarly as in Step 150 of FIG. 1A.

Minimum Coordination (MC) Scoring Module 232 may be configured to assign a score to a candidate passage, similarly as in Step 120 of FIGS. 1A and 1B. In some exemplary embodiments, MC Scoring Module 232 may be configured to determine a minimum coordination score, representing a relative similarity between the candidate passage and the query, similarly as in Step 160 of FIG. 1A. In some exemplary embodiments, MC Scoring Module 232 may be configured to compute the minimum coordination score based on the calculated first, second and third measures and obtained value of said function for each of the various overlapping terms, as may be communicated to MC Scoring Module 232 by Feature Extraction Module 228. In some exemplary embodiments, MC Scoring Module 232 may be configured to determine the minimum coordination score using summation over all overlapping terms in the set. In some further exemplary embodiments, MC Scoring Module 232 may be configured to determine arguments of the sum based on the value and the third measure of each of the overlapping terms. Additionally or alternatively, MC Scoring Module 232 may be configured to normalize the summation so that the minimum coordination score may range from zero to one. In some exemplary embodiments, MC Scoring Module 232 may be further configured to compute a summation over the covered query terms of a product of the second and third measures calculated by Feature Extraction Module 228, to produce thereby an appropriate normalization factor.

Machine Learning Module 240 may be configured to apply a machine learning process for learning one or more relaxation parameters for terms of Document Collection 209, similarly as in Step 105 of FIG. 1B. Machine Learning Module 240 may provide the learned relaxation parameter(s) to Feature Extraction Module 228 and/or to MC Scoring Module 232 for introduction into the first measure calculation and function evaluation, and/or into the minimum coordination score determination, and optionally also into the normalization factor computation (where applicable), respectively, whereby a pseudo query is obtained and processed, similarly as in Steps 135 to 165 of FIG. 1B.

Figure 3:
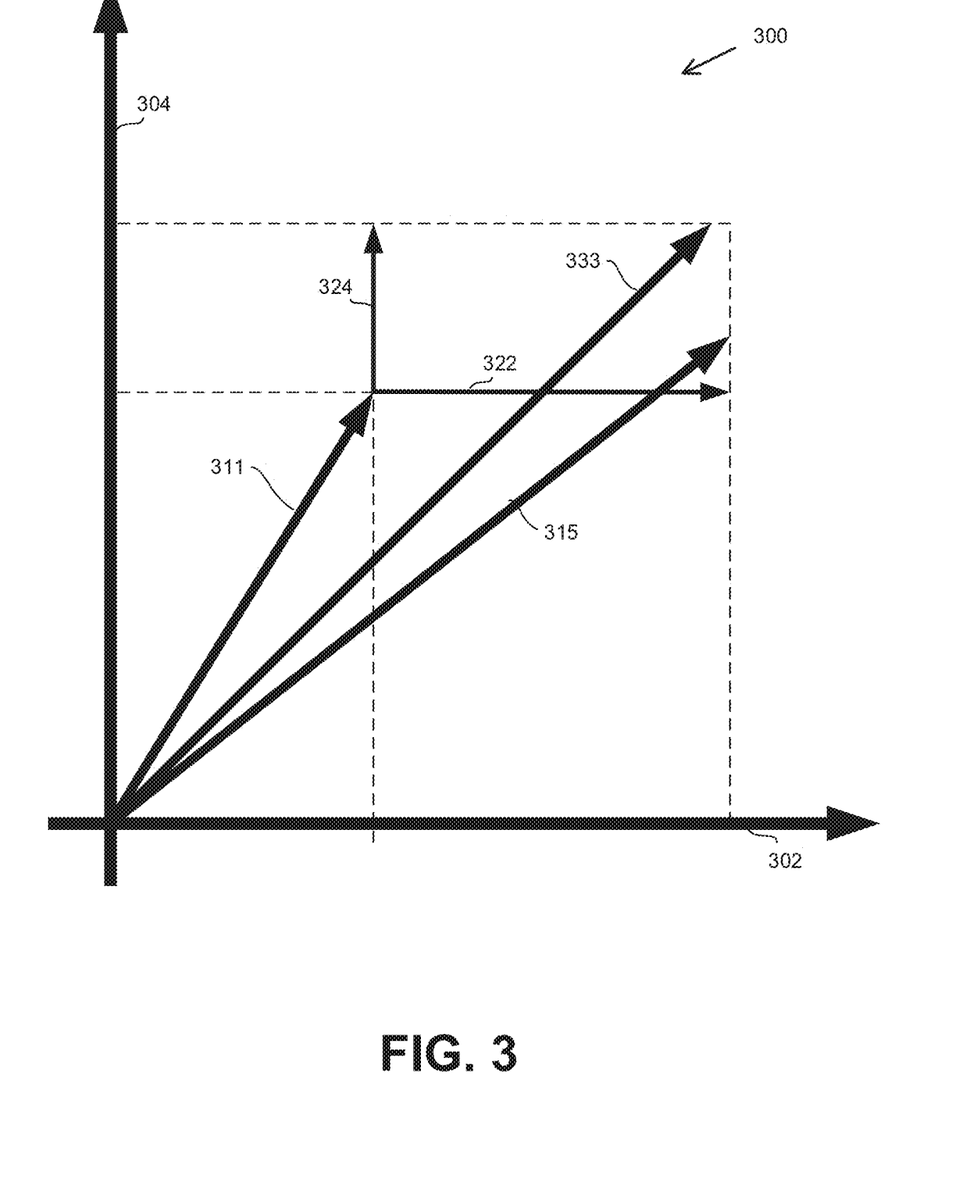
FIG. 3 shows a schematic illustration of an exemplary normed vector space embedding of terms and respective passages scoring, in accordance with some exemplary embodiments of the disclosed subject matter.

Referring now to FIG. 3 showing a schematic illustration of an exemplary normed vector space embedding of terms and respective passages scoring, in accordance with some exemplary embodiments of the disclosed subject matter.

An Embedding 300 of passages scores in a normed vector space may be provided, such as, for example, using vector representation of words, e.g. word2vec model or the like. A word embedding or vector may use a numerical value to represent a given word, wherein similar passages may have similar vectors, where vector similarity may be considered as being easy to compute, such as, for example, using dot product or the like. The vector space may be spanned by the various (unique) terms contained in a passage or set of passages, e.g. an entire document collection, wherein a set of terms contained therein may constitute a spanning set of the vector space.

As shown in FIG. 3, a first base vector, Term 302, may be employed to represent a first term within a passage, and a second base vector, Term 304, may be employed to represent a second term within the passage. The representative first and second base vectors Terms 302 and 304, respectively, may be orthogonal to one another, such as illustrated in FIG. 3. It will be appreciated that, while exemplary Embedding 300 is illustrated in FIG. 3 as two-dimensional, this is solely for the sake of facilitating understanding and demonstration, and the disclosed subject matter however is not meant to be so limited to any particular dimension, but rather it may be applied for normed vector spaces of any arbitrary dimensionality. In particular, Embedding 300 may be of a dimensionality equal in magnitude to a size of a dictionary of terms, such as corresponding to the document collection at hand, wherein each coordinate corresponds to a single term. In some exemplary embodiments, the dimension may be the number of covered query terms, i.e. "hot-spots" in a candidate passage for a given input query.

In some exemplary embodiments, the i-th coordinate of a vector in the image space of Embedding 300 may be a numeric value reflecting a weight of a covered query term within a given passage, such as, for example, a tf-idf weight of a term or the like. A query containing the two terms that are each mapped under Embedding 300 to the vectors Term 302 and Term 304, respectively, may be represented by a vector denoted herein as Query 311, according to corresponding weights of each of base vectors Terms 302 and 304 in the query. Similarly, a candidate passage also containing those two terms, although with different occurrence rates (whether absolute and/or relative to other terms in the document collection), may be mapped under Embedding 300 to a vector denoted herein as Passage 315. A first relaxation parameter, Loose Param 322, and a second relaxation parameter, Loose Param 324, may be two respective relaxation parameters learned for Terms 302 and 304, in accordance with the disclosed subject matter. Loose Params 322 and 324 may be either a same uniform relaxation parameter for all dictionary terms (i.e. corresponding terms of the base vectors, Terms 302 and 304, in the illustrated example of Embedding 300), or distinct parameters different from one another, as discussed herein, and as shown and exemplified in FIG. 3. The values of Loose Params 322 and 324 may reflect an extent to which a minimum coordination constraint on a candidate passage with respect to a given query, such that a weight of a term in a candidate passage does not exceed a weight of that term in the query, is rigorously enforced or not. Put differently, Loose Params 322 and 324 may stand for a level of leniency tolerated for an upper bound imposed by a given input query, where the larger is a value of Loose Param 322 and/or Loose Param 324, the higher (i.e. looser) the upper bound is, and vice versa (i.e., the closer the value of the parameter(s) is to 1, the tighter the bound is).

It will be appreciated that introduction of Loose Params 322 and 324 into each covered terms associated with Query 311 results in a pseudo query being obtained, which pseudo query may be represented under Embedding 300 by a vector denoted herein as Pseudo Query 333. Furthermore, as shown in FIG. 3, the angle between the representative vectors Pseudo Query 333 and Passage 315 may be smaller than the angle between Query 311 and Passage 315, wherein an angle between vectors may represent the similarity therebetween, such that similar vectors are approaching co-linearity, while dissimilar vectors are spaced from one another with a large angle. It will be appreciated that similarity between vectors may be easily determined using dot product or likewise computation, thus an easy to compute similarity measure between passages may be obtained via normed vector space embedding such as Embedding 300 of FIG. 3.

EXAMPLES

A loose minimum coordination (LMC) passage scoring approach in accordance with the disclosed subject matter was implemented and tested as part of a passage retrieval solution known as CogIR™, available from International Business Machines, Armonk, N.Y., USA. Using a real use-case of question-answering over Wikipedia corpus, this approach, as a single passage scorer, have been found to significantly outperform many alternative approaches whose details are described in the above cited publications. The evaluation results, provided in Table 1 below, were obtained using IBM's Watson™ factoid competition 7-validation set. It will be appreciated that some of these alternatives may be implemented as private cases of LMC scoring using a suitable setting of relaxation parameter(s), as illustrated in Table 1, second column, where applicable.

TABLE 1

| Method | $\beta/\beta_t$ | Accuracy | Precision |
| --- | --- | --- | --- |
| tf-idf | $\infty$ | 0.491 | 0.208 |
| $\sum_{t \in q \cap p} idf(t)$ | $\dfrac{1}{tf(t, q)}$ | 0.677 | 0.353 |
| Jaccard*idf | | 0.448 | 0.218 |
| Generalized Jaccard | | 0.533 | 0.241 |
| Generalized Jaccard*idf | | 0.524 | 0.267 |
| LMC | 1.2 | 0.69 | 0.367 |

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus having a processor, the processor being adapted to perform the steps of:
    obtaining a set of candidate passages in a document collection, each of which candidate passages are potential matches for a query, wherein each candidate passage is characterized by having a lower overlapping terms occurrence than an overlapping terms occurrence in the query;
    for each candidate passage in the set, assigning a score by performing the steps of:
        determining a set of overlapping terms between the each candidate passage and the query;
        calculating, for each overlapping term in the set, a first measure of a weight of the term in the query, a second measure of a weight of the term in the each candidate passage, and a third measure of a specificity of the term in the document collection;
        evaluating a function of the first and second measure to obtain a value reflecting a condition on the relation therebetween; and
        determining, based on the value and the first, second and third measures obtained for each of the overlapping terms, a minimum coordination score representing a relative similarity between the each candidate passage and the query, wherein said determining the minimum coordination score comprises performing a summation over all terms in the set of overlapping terms, wherein the summation is normalized, wherein said determining the minimum coordination score comprises computing the minimum coordination score of the each candidate passage irrespective of other candidate passages, wherein the score is assigned in accordance with the formula:

$$Score_{psg}(p;q) \stackrel{def}{=} \frac{\sum_{t \in q \cap p} \min(tf(t,q), tf(t,p)) * idf(t)}{\sum_{t \in q} tf(t,q) * idf(t)}$$

wherein p is the each candidate passage, wherein q is the query, wherein tf is a term frequency in a passage, wherein idf is an inverse document frequency of a term in a document collection.

2. The computerized apparatus of claim 1, wherein the condition mandates that the second measure does not exceed the first measure.

3. The computer-implemented of claim 2, wherein the function is a minimum function, whereby the value obtained is the smallest argument of the function.

4. A computerized apparatus having a processor, the processor being adapted to perform the steps of:
    obtaining a set of candidate passages in a document collection, each of which candidate passages are potential matches for a query, wherein each candidate passage is characterized by having a lower overlapping terms occurrence than an overlapping terms occurrence in the query;

for each candidate passage in the set, assigning a score by performing the steps of:

determining a set of overlapping terms between the each candidate passage and the query;

calculating, for each overlapping term in the set, a first measure of a weight of the term in the query, a second measure of a weight of the term in the each candidate passage, and a third measure of a specificity of the term in the document collection;

evaluating a function of the first and second measure to obtain a value reflecting a condition on the relation therebetween; and determining, based on the value and the first, second and third measures obtained for each of the overlapping terms, a minimum coordination score representing a relative similarity between the each candidate passage and the query, wherein said determining the minimum coordination score comprises computing the minimum coordination score of the each candidate passage irrespective of other candidate passages, wherein the minimum coordination score is a loose minimum coordination score obtained by a relaxation operation, wherein the score is assigned in accordance with the formula:

$$Score_{psg}(p; q) \overset{def}{=} \frac{\sum_{t \in q \cap p} \min(\beta_t * tf(t, q), tf(t, p)) * idf(t)}{\sum_{t \in q} \beta_t * tf(t, q) * idf(t)}$$

wherein p is the each candidate passage, wherein q is the query, wherein β is the relaxation parameter, wherein tf is a term frequency in a passage, wherein idf is an inverse document frequency of a term in a document collection.

5. The computerized apparatus of claim 4, further comprising, prior to said obtaining and/or assigning the score, applying a machine learning process whereby at least one relaxation parameter for use in the relaxation operation, is determined.

6. The computerized apparatus of claim 4, wherein each of the at least one relaxation parameter is learned individually for each term of the document collection.

7. A computerized apparatus having a processor, the processor being adapted to perform the steps of:

obtaining a set of candidate passages in a document collection, each of which candidate passages are potential matches for a query, wherein each candidate passage is characterized by having a lower overlapping terms occurrence than an overlapping terms occurrence in the query;

for each candidate passage in the set, assigning a score by performing the steps of:

determining a set of overlapping terms between the each candidate passage and the query;

calculating, for each overlapping term in the set, a first measure of a weight of the term in the query, a second measure of a weight of the term in the each candidate passage, and a third measure of a specificity of the term in the document collection;

evaluating a function of the first and second measure to obtain a value reflecting a condition on the relation therebetween; and determining, based on the value and the first, second and third measures obtained for each of the overlapping terms, a minimum coordination score representing a relative similarity between the each candidate passage and the query, wherein said determining the minimum coordination score comprises computing the minimum coordination score of the each candidate passage irrespective of other candidate passages, wherein the minimum coordination score is a loose minimum coordination score obtained by a relaxation operation, wherein each of the at least one relaxation parameter is learned individually for each term of the document collection, wherein the score is assigned in accordance with the formula:

$$Score_{psg}(p; q) \overset{def}{=} \frac{\sum_{t \in q \cap p} \min(\beta * tf(t, q), tf(t, p)) * idf(t)}{\sum_{t \in q} tf(t, q) * idf(t)}$$

wherein p is the each candidate passage, wherein q is the query, wherein $\beta_t$ is a relaxation parameter for a term t, wherein idf is an inverse document frequency of a term in a document collection.

* * * * *